July 3, 1962 R. BINDER 3,042,168
FRICTION COUPLING
Filed July 14, 1959 2 Sheets-Sheet 1

INVENTOR

Richard Binder

July 3, 1962

R. BINDER 3,042,168

FRICTION COUPLING

Filed July 14, 1959

INVENTOR

Richard Binder

United States Patent Office 3,042,168
Patented July 3, 1962

3,042,168
FRICTION COUPLING
Richard Binder, Schweinfurt (Main), Germany, assignor to Fichtel & Sachs A.G., Schweinfurt (Main), Germany, a corporation of Germany
Filed July 14, 1959, Ser. No. 827,074
Claims priority, application Germany July 25, 1958
7 Claims. (Cl. 192—107)

The present invention relates to friction couplings in which energy of motion is transmitted from a transmitting to an absorbing member as in a friction clutch in which a driving member actuates movement of a driven member, or in a friction brake in which the energy of a moving member is transformed into heat by frictional engagement with a stationary member. More particularly, the invention is concerned with a friction coupling in which vibrations during relative movement of the two coupling members while in frictional contact are avoided.

In frictional couplings of the type described, such as clutches and brakes, the friction faces of the two engaging members are made of materials which have a high coefficient of friction and which are capable of withstanding the mechanical stresses induced, and the elevated temperature generated thereby. A combination of one metallic friction face with another face consisting at least in part of an organic material has been widely employed. In automotive clutches, the metallic face is frequently made of cast iron, and the opposite face in contact therewith is made of cotton and asbestos which are woven or molded together and impregnated with resin or a similar binder. Similar combinations of materials have been widely employed in brakes.

More recently, the advantages of friction facing materials of inorganic material for cooperation with a cast iron opposite friction face have been recognized, and friction facings of sintered bronze powder and of ceramic materials have been employed. These inorganic materials have better wear properties and resist higher temperatures than the previously employed softer organic materials. They can readily be formulated to give them the desired frictional properties.

Although the advantages of the newer friction materials are evident, their application so far has been limited substantially to industrial uses, in machinery, or in freight-carrying vehicles, that is, in applications not sensitive to noise. In the automotive field, the clutch and brake facings of the inorganic type have not been found generally acceptable, and they have so far been practically excluded from use in passenger automobiles because they tend to generate noise. When a cast iron pressure plate is brought into engagement with a metallic or ceramic friction facing in a conventional brake or clutch arrangement, a whistling or squealing sound is generated. It has been found that these objectionable noises are caused by friction-induced vibrations and that they are influenced by the rate of relative sliding movement of the engaging elements and by their contact pressure.

The tendency to generate noises can be somewhat modified by controlling the composition of the facing materials. When powdered graphite is mixed with the bronze powder from which friction facings are then produced by compression and sintering, the clutches or brakes equipped with such friction materials operate almost quietly immediately after installation. The noise level, however, increases during continued operation, and particularly if the temperature of the friction facings is permitted to rise. The graphite component is preferentially abraded from the friction surface so that the amount of available graphite is reduced below the effective amount.

The present invention is concerned with a different approach to the solution of the problem of suppressing noise generated by relatively hard and durable friction facings in friction couplings, such as friction clutches and friction brakes. It has been found that the friction-induced vibrations responsible for the noise generated can be suppressed or reduced to a non-objectionable level by shaping the engaging friction faces in such a manner that the individual portions of the friction faces are alternatingly in and out of engagement with the other friction face and that the magnitude of the contact pressure varies during relative movement of the two coupling members in frictional contact with each other.

With this object and others in view, the invention provides friction faces on the motion transmitting and the motion absorbing coupling members which are rotatable relative to each other about an axis and are also movable relative to each other for frictional engagement of the friction faces which are arranged on their respective members opposite each other. The friction faces jointly define an annular friction surface during rotation of the coupling members, and this surface is bounded by two circles concentrically arranged about the axis of rotation and spaced from each other, as measured in an axial plane, by the width of the friction surface. The friction face of one of the coupling members of the invention includes a plurality of circumferentially consecutive portions of a width smaller than the width of the friction surface. These portions are offset relative to each other in the direction of spacing of the circles.

The several consecutive portions of the inventive friction face described are preferably contiguous so that they form a continuous friction face surrounding the axis of rotation in a pattern which may be regular, but deviates from that of a circular ring member by the varying arrangement of the consecutive portions over the width of the friction surface.

Best results are achieved if the afore-described friction face cooperates with another friction face which includes a plurality of circumferentially spaced portions having a width at least as great as the width of the friction surface. During relative rotation of the friction faces, every portion of the last-mentioned friction face is alternatingly in and out of contact with the first-described friction face because of the variation of lateral placing of the portions of the latter, and the portions of this face are alternatingly subject to the maximum contact pressure exerted by the portions of the cooperating friction face which extend over the full width of the friction surface, and are under minimum contact pressure when they pass the space between two successive portions of the second-mentioned friction face.

The patterns of distribution of the relatively narrow portions of one friction face and the spacing pattern of the portions of the other friction face are preferably selected in such a manner that rhythmically repetitive conditions during operation of the coupling, which in themselves may lead to vibration and noise, are avoided. If the patterns are made symmetrical about the common axis in the interest of static and dynamic balancing of the rotary parts, the friction faces are shaped in such a manner that the number of axial planes of symmetry in one friction face is different from that in the cooperating other friction face. Care is preferably taken to avoid an arrangement in which the number of planes of symmetry in one face is a multiple by an integer factor of the number of planes of symmetry in the other face.

Other features and advantages of the invention will become apparent to those skilled in the art as the disclosure is made in the following detailed description of preferred embodiments of the invention as illustrated in the attached drawing in which.

Figure 1:
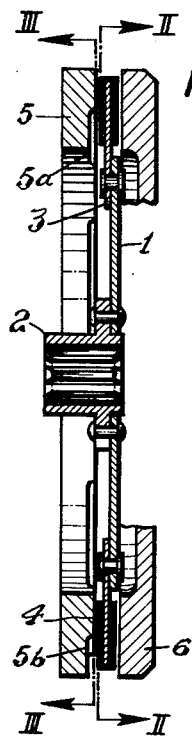
FIG. 1 is an axial sectional view of a portion of an automotive clutch according to the invention.
Figure 2:
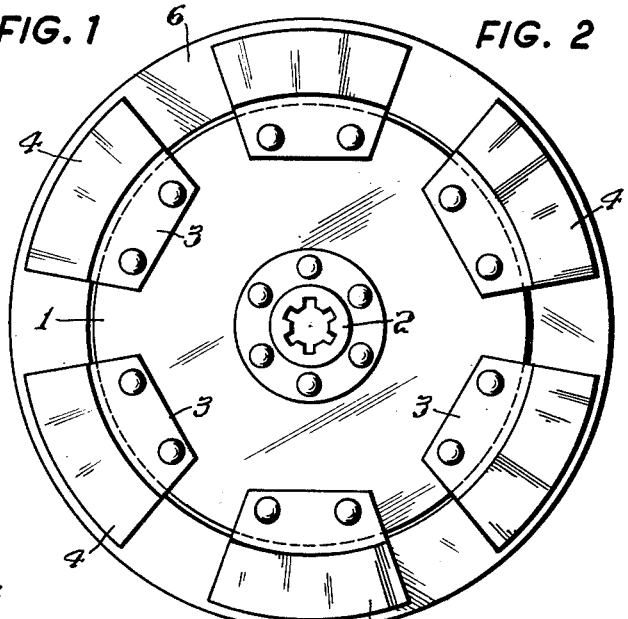
FIG. 2 shows a radial section of the device of FIG. 1 taken on the line II—II and looking in the direction of the arrows.
Figure 3:
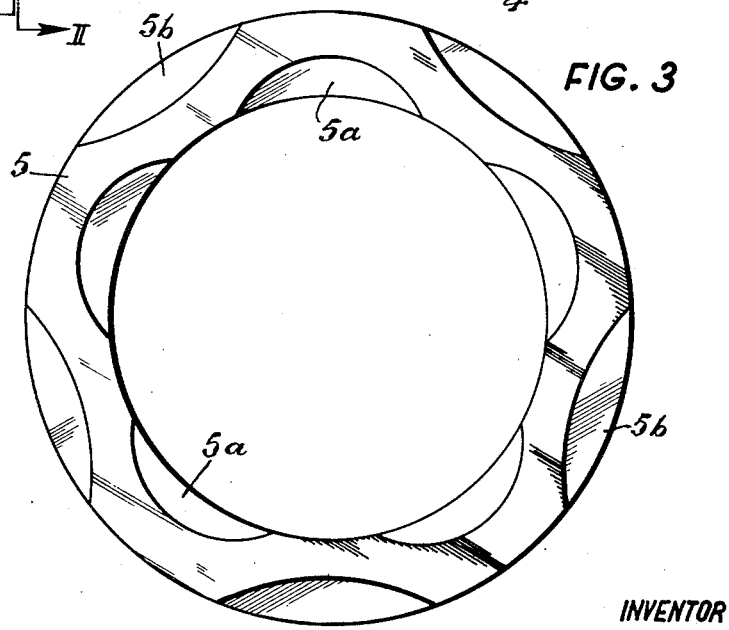
FIG. 3 is a radial sectional view of the device of FIG. 1 taken on the line III—III.

Referring now to the drawing, and more specifically to FIGS. 1–3, there is shown an automotive clutch assembly of basically conventional design in which a clutch disk 1 is mounted on a splined hub 2. The hub 2 is intended to slide lengthwise along the splines of the clutch shaft (not shown) which is the driven output member of the clutch. The disk 1 is made of spring steel or similar material and is riveted to the hub 2.

The circumference of the disk 1 carries six spaced steel segments 3 which are riveted to the disk. Friction facings 4 are cemented to both faces of the segments 3 projecting beyond the circumference of the disk 1 as best seen in FIG. 1.

The disk 1 is driven by frictional engagement with the pressure plate 5, a heavy flat metal ring, and with the rear face of the flywheel 6. The other elements of the clutch not relevant to the invention have been omitted from the drawing for the sake of clarity, but it will be understood that the pressure plate 5 is mounted in an enclosing steel cover which is bolted to the flywheel so that the plate 5 rotates with the flywheel 6. Movement of the flywheel is actuated by the crankshaft of the engine the power of which is to be transmitted by the clutch to the wheels of a vehicle or the like. The operating members of the clutch also have been omitted. Friction clutches of the type illustrated are commonly equipped with heavy springs urging the pressure plate toward the flywheel, and with means under the control of an operator for moving the pressure plate and the flywheel away from each other against the constraint of the spring.

As best seen in FIG. 3, the annular face of the pressure plate 5 opposite the friction facings 4 on the disk 1 is formed with five axially extending depressions 5a along the inner circumference of the plate 5, and with five axially extending depressions along the outer circumference of the plate. Each of the depressions is bounded in a radial direction by a portion of the plate circumference and by a circularly arcuate wall. They are symmetrically arranged about the axis of rotation of the clutch in such a manner as to leave a raised friction face surrounding the axis in a meandering pattern of circumferentially successive portions which are radially offset relative to each other.

When the pressure plate 5 of FIG. 3 is superimposed on the friction facings 4 of FIG. 2 as shown in FIG. 1, and the disk is rotated relative to the pressure plate, or vice versa, the raised friction face of the pressure plate slides over the friction facings 4 of the disk in such a manner that the area of contact on each friction facing moves radially inward and outward during rotation, alternatingly leaving individual portions free of contact with the friction face of the disk while a radially adjacent portion is in frictional engagement. The gaps between the individual segments 3 and their friction facings 4 alternatingly apply full contact pressure and minimum pressure to every portion of the raised friction face of the pressure plate 5. The configuration of the friction face 5 illustrated is quite effective in preventing vibration and noise when the friction facing on the disk is of the more common unitary annular type without gaps between individual segments, but the arrangement shown is preferred.

It will be noted that the friction disk arrangement has twelve axial planes of symmetry whereas the pressure plate has ten, and this difference in symmetry greatly contributes to the suppression of vibrations. When the pressure plate 5 is an iron casting and the friction facings 4 are of sintered bronze powder, virtually no noise is generated when the clutch of FIGS. 1–3 is gradually engaged at different rotational speeds of the flywheel 6 and the disk 1.

Figure 4:
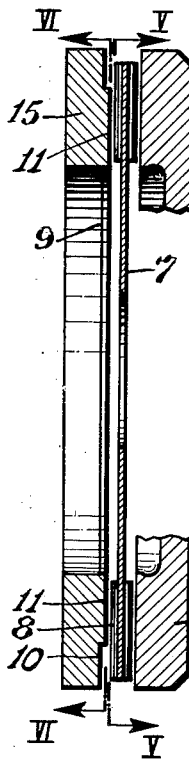
FIG. 4 illustrates another embodiment of an automotive clutch of the invention in fragmentary representation of an axial section.
Figure 5:
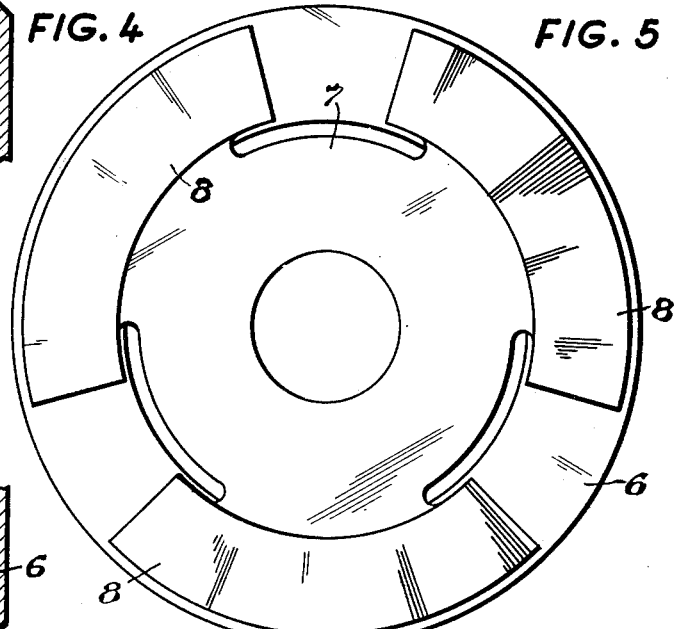
FIG. 5 shows a radial section of the device of FIG. 4, the section being taken on the line V—V.
Figure 6:
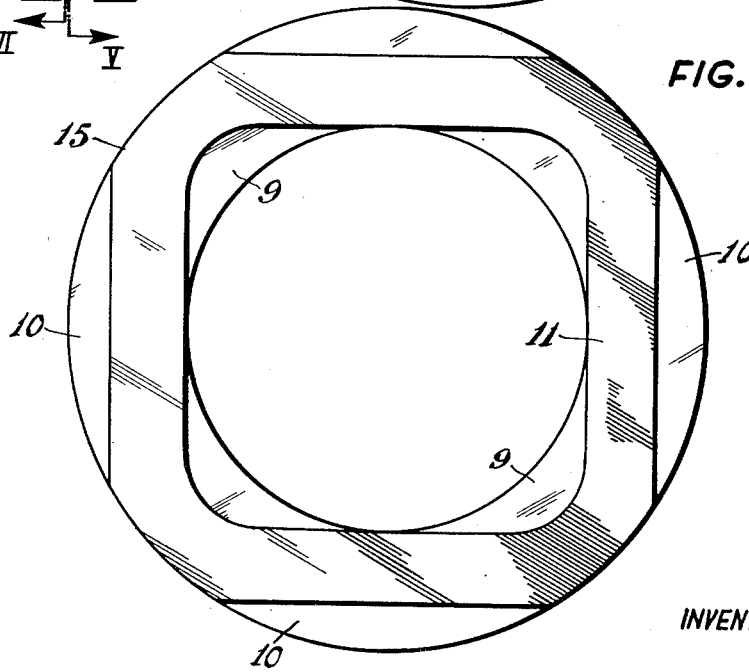
FIG. 6 is another radial sectional view of the device of FIG. 4 taken on the line VI—VI.

The embodiment of the invention illustrated in FIGS. 4–6 in axial section and in two radial sections is substantially similar to that shown in the corresponding FIGS. 1–3. The elements not shown in the first example of an embodiment of the invention have again been omitted together with the hub of the clutch disk.

The disk 7 is equipped with three segments carrying the friction facings 8. The friction face of the annular pressure plate 15 is formed with four axially extending depressions 9 adjacent the inner edge of the plate and with four depressions 10 along the outer perimeter which leave a raised annular friction face 11 of approximately quadratic outline with rounded edges. The friction face 11 has circumferentially consecutive portions offset relative to each other in a radial direction so as to achieve the same purpose as the meandering pattern of the pressure plate of FIG. 3.

The embodiment of the invention illustrated in FIGS. 4–6 operates in the same manner as that shown in FIGS. 1–3 and is highly effective in suppressing friction-induced vibrations during engagement of the clutch. The planes of symmetry of the disk 7 and the pressure plate 15 are six and eight in number respectively so that resonant vibrations of a frequency less than that corresponding to twenty-four planes of symmetry cannot occur. Because of the energy requirements of vibrations of high frequency, audible noises are not produced by the clutch illustrated.

It has been found that it is usually sufficient to give the inventive configuration produced by recesses extending away from the friction surface only to the friction face of the pressure plate, and to leave the back face of the flywheel flat in the usual manner. It is understood, though, that the flywheel face may be equally contoured if desired to increase the vibration suppressing effect, or for other purposes.

Quite suprisingly, it has been found that no significant increase in the rate of friction facing wear is caused by the reduction in the surface area of the pressure plate or of the flywheel face which is in contact with the friction facing of the disk.

The configuration of the recesses and raised portions of the friction faces cooperating with a frictional facing material that would produce objectionable noises in a conventional arrangement can, of course, be modified in many ways without departing from the scope of the invention. The raised portions need not be continuously arranged about the axis of rotation, but the friction face may consist of a plurality of straight or curved separate ridge portions while the recesses communicate with each other.

The illustrated embodiments of the invention operate as disk brakes when the wheels cause rotation of the clutch disks 5, 15 at a rotational speed greater than that of the flywheel 6. The friction coupling of the invention can also be adapted to other types of disk brakes. It is equally applicable to clutches or brakes the friction faces of which define substantially cylindrical friction surfaces about an axis of rotation. The two circles which bound the friction surface defined by the cooperating friction faces of the illustrated clutches are located in substantially a common radial plane and are of different radius. In a drum brake or a band clutch in which the friction surface is substantially cylindrical, the two circles are axially spaced and of equal radius. The invention is equally applicable to friction couplings, such as brakes or clutches, in which the friction surface is dished or conical, or assumes any other shape generated by rotation of a line about an axis.

Where a cast iron friction face is paired with a friction face formed of metal powder or of ceramic material, it is usually preferred to provide the iron casting with the special friction face configuration in which circumferentially consecutive face portions are laterally offset relative to each other, and such a friction face can be formed by casting at virtually no increase in cost over a plain flat or simply curved face.

It should be understood of course that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What I claim is:

1. In a friction coupling, in combination,
   (a) a motion transmitting member;
   (b) a motion absorbing member, said members being rotatable relative to each other about an axis; and
   (c) a friction face on each of said members opposite the friction face of the other member and engageable therewith, said faces, when engaged during relative rotation of said members, jointly defining an annular friction surface bounded by two circles centered on said axis and spaced from each other by the width of said surface;
   (d) the friction face of one of said members including a plurality of circumferentially consecutive portions, said portions having each a width perpendicular to said circles smaller than said width of said surface, and being offset relative to each other in the direction of spacing of said circles in a meandering pattern, said portions being in said surface when said friction faces are engaged.

2. In a friction coupling as set forth in claim 1, the friction face of the other one of said members including a plurality of circumferentially spaced friction facings, each facing having a width at least as great as the width of said friction surface.

3. In a friction coupling as set forth in claim 2, said friction faces each having a plurality of axial planes of symmetry, the number of axial planes of symmetry of each of said friction faces being different from the number of axial planes of symmetry of the other friction face.

4. In a friction coupling as set forth in claim 3, the number of axial planes of symmetry of each friction face being different from all integral multiples of the number of axial planes of symmetry of the other friction face.

5. In a friction coupling as set forth in claim 2, said friction face of said one member being annular about said axis and being constituted by said portions.

6. In a friction coupling as set forth in claim 5, said friction face of said one member having a plurality of axial planes of symmetry.

7. In a friction coupling as set forth in claim 5, said one member being a flat ring, and said friction face thereof being flat in a radial plane and continuous about said axis.

References Cited in the file of this patent

FOREIGN PATENTS

| 1,775,521 | Goostray | Sept. 9, 1930 |
| 1,780,234 | Johnston | Nov. 4, 1930 |
| 1,898,978 | Lane | Feb. 21, 1933 |
| 1,936,240 | Lane | Nov. 21, 1933 |
| 2,217,529 | Spase | Oct. 8, 1940 |
| 2,690,248 | McDowall | Sept. 28, 1954 |

FOREIGN PATENTS

| 406,347 | Great Britain | Feb. 26, 1934 |